United States Patent
Kondo et al.

(10) Patent No.: US 8,598,738 B2
(45) Date of Patent: Dec. 3, 2013

(54) POWER ASSIST DEVICE

(75) Inventors: Takeshi Kondo, Mishima (JP);
Katsutoshi Miyazaki, Guangdong (CN)

(73) Assignee: Meidensha Corporation, Tokyo (JP)

( * ) Notice: Subject to any disclaimer, the term of this patent is extended or adjusted under 35 U.S.C. 154(b) by 678 days.

(21) Appl. No.: 12/935,118

(22) PCT Filed: Mar. 30, 2009

(86) PCT No.: PCT/JP2009/056461
§ 371 (c)(1),
(2), (4) Date: Sep. 28, 2010

(87) PCT Pub. No.: WO2009/123094
PCT Pub. Date: Oct. 8, 2009

(65) Prior Publication Data
US 2011/0068628 A1    Mar. 24, 2011

(30) Foreign Application Priority Data

Mar. 31, 2008 (JP) ................................. 2008-091292

(51) Int. Cl.
*H02J 3/32* (2006.01)
*H02J 7/00* (2006.01)

(52) U.S. Cl.
USPC .................... 307/46; 307/48; 307/51; 307/66

(58) Field of Classification Search
USPC .......................................... 307/46, 48, 51, 66
See application file for complete search history.

(56) References Cited

U.S. PATENT DOCUMENTS 7,586,290 B2    9/2009   Hirata et al.

FOREIGN PATENT DOCUMENTS

| JP | 8-237884 A | 9/1996 |
|---|---|---|
| JP | 11-27874 A | 1/1999 |
| JP | 2001-320893 A | 11/2001 |
| JP | 2003-244840 A | 8/2003 |
| JP | 2004-265683 A | 9/2004 |
| JP | 2005-324887 A | 11/2005 |
| JP | 2005-354825 A | 12/2005 |
| JP | 2008-62826 A | 3/2008 |

*Primary Examiner* — Rexford N Barnie
*Assistant Examiner* — Dru Parries
(74) *Attorney, Agent, or Firm* — Foley & Lardner LLP

(57) ABSTRACT

[Problem] When load power is assisted, the number of component parts becomes greater because an AC power detector is provided in the AC power supply of an inverter.
[Means for Solution] An instantaneous output power calculating section comprises a power calculating section to calculate power by using detected values of voltage and current on the output side of an inverter, and a correction calculating section to correct the calculated power. Moreover, limiter sections are provided, respectively, in charge control section and discharge control section for a chopper, and limiter values of the limiter sections are varied by the power calculated by the instantaneous output power calculating section. The charge control section and discharge control section for the chopper are configured so that a detected DC voltage of the inverter is inputted, deviation signals are obtained between the detected DC voltage and preset upper and lower limit voltages, the deviation signals are inputted to voltage control sections, and a value of charge command is calculated.

1 Claim, 3 Drawing Sheets

POWER ASSIST DEVICE

TECHNICAL FIELD

The present invention relates to a power assist apparatus or device, and more specifically to a power assist apparatus or device for eliminating the need for devices for detecting voltage and current in a power system.

BACKGROUND ART

The power assist apparatus is connected between an AC power system and a load and used as an assist for the load power. This power assist apparatus includes a power storage device which combines a step-up/down (buck-boost) chopper and an electricity (or is energy) storage device such as an electric double layer capacitor, and which is connected with a DC circuit of an inverter. The power assist is a term used here to include peak-cut, load leveling, power storage and instantaneous voltage decrease compensation. Such power assist apparatus are disclosed in a patent document 1 and a patent document 2.

FIG. 4 is a schematic view showing the structure of a power assist apparatus. An inverter 1 includes a forward converting section 2 for converting AC to DC, and a bidirectional converting section 3 having bidirectional converting function. The inverter 1 is connected between a commercial power source 4 and a load 5. A step up/down chopper 6 and an electricity storage device 7 form a power storage device, which is connected with the DC circuit of the inverter 1. This power assist apparatus charges the electricity storage device 7 through chopper 6 when, for example, the DC voltage of inverter 1 increases in a regenerative state of load 5 and the DC voltage of inverter 1 becomes higher than or equal to a predetermined charging voltage, and supplies energy stored in electricity storage device 7 to load 5 through chopper 6 and bidirectional converting section 3 when the voltage of commercial power source 4 decreases.

Patent Document 1: JP 2003-244840A
Patent Document 2: JP H11 (1999)-27874A

DISCLOSURE OF INVENTION

Problem to be Solved by the Invention

In the earlier technology including the patent documents 1 and 2, in the case of an instantaneous voltage decrease compensation, for example, for a monitor voltage for performing the charge control and discharge control, there are provided voltage transformer and current transformer on the AC side of the forward converting section of the inverter, the thus-obtained detected voltage and current are monitored by a monitoring section, and the voltage is used for the control. Accordingly, the power assist system requires a device for monitoring the commercial power, so that the size and cost of the power assist system are increased.

It is an object of the present invention to provide power assist apparatus requiring no device for monitoring the commercial power for the charge/discharge control.

Means for Solving the Problem

According to the present invention, in a power assist apparatus for assisting a load power with an inverter connected with an AC power source and a power storage device which is connected with a DC circuit of the inverter and which includes a chopper and an electricity storage device, the power assist apparatus comprises: an instantaneous output power calculating section including a power calculating section configured to detect a voltage and a current between the inverter and a load, to transform the voltage and current by a coordinate transformation, and to calculate a power on the basis of the transformed voltage and current, and a correction calculating section to correct the calculated power; and a chopper control circuit including voltage control sections configured to calculate a charge command and a discharge command, respectively, by receiving a deviation signal between the detected DC circuit voltage of the inverter and a preset value of an upper limit voltage and a deviation signal between the detected DC circuit voltage of the inverter and a preset value of lower limit voltage, limiter sections to receive the signals, respectively, from the voltage control sections, and PWM control sections to produce PWM signals, respectively, by receiving signals from the limiter sections, the instantaneous output power calculating section and the limiter sections of the chopper control circuit being so arranged that a signal of the power calculated by the instantaneous output power calculating section is supplied to each of the limiter sections, and thereby each of the limiter sections varies a limiter value.

Moreover, the correction calculating section of the instantaneous output power calculating section is configured to correct an input-output power characteristic of the inverter.

Effects of the Invention

As mentioned before, the power assist apparatus according to the present invention can make it possible to perform the power assist control based on an estimated instantaneous output power, with no power detecting device on the AC power source's side in the inverter, and thereby to reduce the size of the apparatus. Moreover, in the case of a parallel operation, it is possible to adjust the load sharing easily. Furthermore, it is possible to make maximum use of the charging and discharging efficiencies by grasping the efficiency characteristic as the power assist apparatus, and using the optimum efficiency point, as a threshold of the limiter.

BEST MODE(S) FOR CARRYING OUT THE INVENTION

Figure 1:
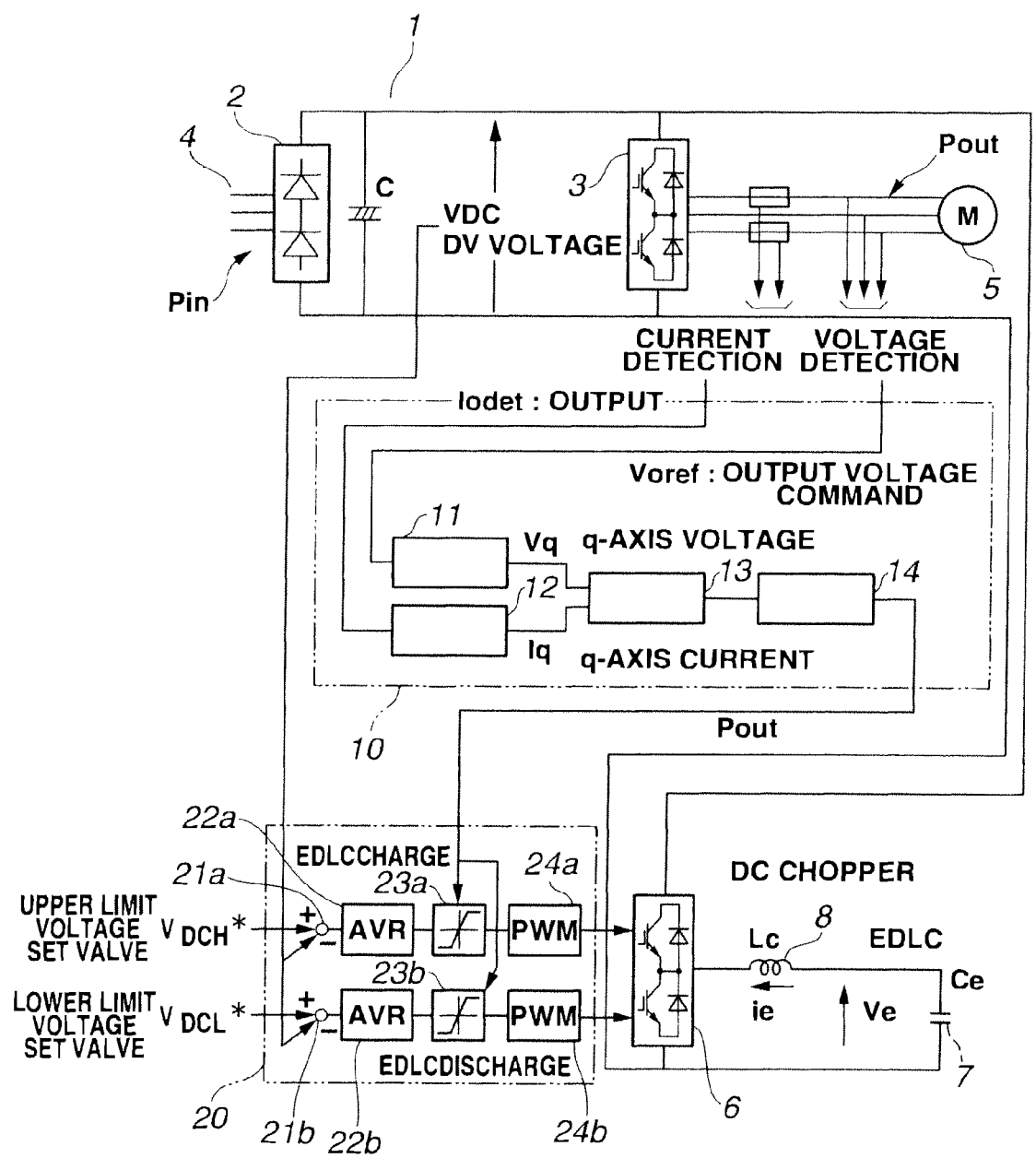
FIG. 1 is a block diagram showing an embodiment according to the present invention.
Figure 4:
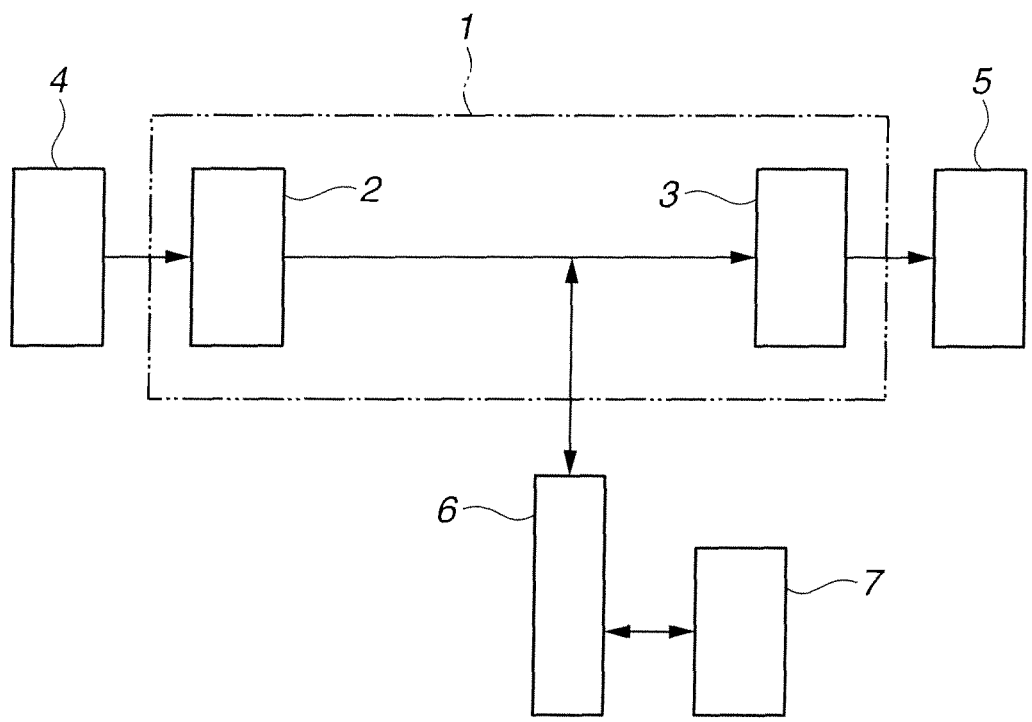
FIG. 4 is a block diagram of a power assist apparatus of earlier technology.

FIG. 1 is a block diagram for showing an embodiment of the present invention. The same components as shown in FIG. 4 are given the same reference numerals and further explanation is omitted. An instantaneous output power calculating section 10 have functions of coordinate transforming sections 11, 12 receiving voltage and current detected from the output side of inverter 1 and converting the detected voltage and current, to Vq and Iq, respectively, a power calculating section 13 calculating power from the q-axis voltage and q-axis current obtained by the coordinate transformation, and a correction calculating section 14. This instantaneous output power calculating section 10 utilizes a function built in a control unit of the inverter.

A chopper control circuit 20 is composed of a charge control section and a discharge control section. Chopper control circuit 20 includes subtraction sections 21a and 21b, voltage control sections 22a and 22b, limiter sections 23a and 23b and PWM control sections 24a and 24b. A subscript "a" represents the charge control section, and a subscript "b" represents the discharge control section. The subtraction section 21a is configured to receive, as inputs, a preset value of an upper limit voltage VDCH* and a detected voltage VDC of the DC circuit of inverter 1, and to calculate a difference is signal of a difference therebetween. The voltage control section 22a is configured to receive, as an input, the difference signal of subtraction section 21a, to calculate a value of a charge command corresponding to the difference signal, and to deliver the charge command value to the limiter section 23a. The limiter section 23a is configured to vary a limiter value in accordance with the voltage Pout supplied from the instantaneous output power calculating section 10, and to limit the charge command with this limiter value. The PWM control section 24a is configured to produce a PWM signal in accordance with the charge command value limited by the limiter value, and to perform a PWM control to a charge switching device of the chopper 6 for the charging operation. Thus, the DC circuit voltage of inverter 1 increased by a regenerating operation of the load is charged through chopper 6 and a reactor 8, to the electricity storage device (which is an electric double layer capacitor in this example) 7.

On the other hand, the subtraction section 21b of the discharge control section is configured to receive, as inputs, a preset value of a lower limit voltage VDCL* and the detected voltage VDC of the DC circuit of inverter 1, and to calculate a difference signal of the difference therebetween. The voltage control section 22b is configured to receive, as an input, the difference signal of subtraction section 21b, to calculate a value of a discharge command corresponding to the difference signal, and to deliver the discharge command value to the limiter section 23b. The limiter section 23b is configured to vary a limiter value in accordance with the voltage Pout supplied from the instantaneous output power calculating section 10, and to limit the charge command with the limiter value. The PWM control section 24b is configured to produce a PWM signal in accordance with the discharge command value limited by the limiter value, and to perform a PWM control to a discharge switching device of the chopper 6. With this operation, the energy stored in the electricity storage device 7 is supplied, through the reactor 8 and chopper 6, to the DC circuit of inverter 1.

When the load 5 is in the power running state, and the load power (load current) of the power running load becomes greater than or equal to a predetermined threshold, then the thus-constructed apparatus according to the present invention opens the charge control and performs the discharge control for peak cutting with the discharge current command. The apparatus narrows down the limiter of limiter section 25b with power Pout as the load current decreases with a decrease of the load, and terminates the discharge control when the voltage becomes equal to a predetermined discharge stop voltage.

When the load 5 comes in the regenerative state, too, the apparatus performs the charge control when the load power (load current) becomes greater than or equal to a predetermined threshold, in the same manner.

The instantaneous output power calculating section 10 disposed in the inverter control circuit estimates the power Pout by the following estimation method.

Figure 2:
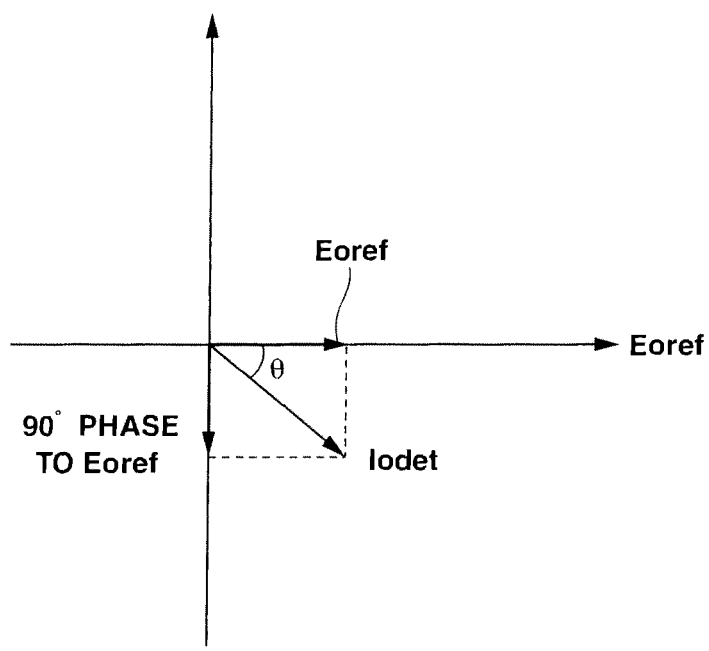
FIG. 2 is a vector diagram of output voltage and current of an inverter.

FIG. 2 is a vector diagram of the output voltage and current of the inverter. By using a signal V0ref[V] which is an output voltage command of the inverter (phase voltage: E0ref), and a signal I0det[A] which is a detected current (output current command), the power calculating section 13 performs an estimating calculation of the instantaneous output power Pout according to the following equation by software.

$$Pout[kW] = \sqrt{3} |V0ref| \times |I0det| \cos\theta$$

As to an efficiency characteristic of the inverter, an efficiency can be calculated by performing a following correction by a evaluation test beforehand.

$$\eta = Pout/Pin [\%]$$

Figure 3:
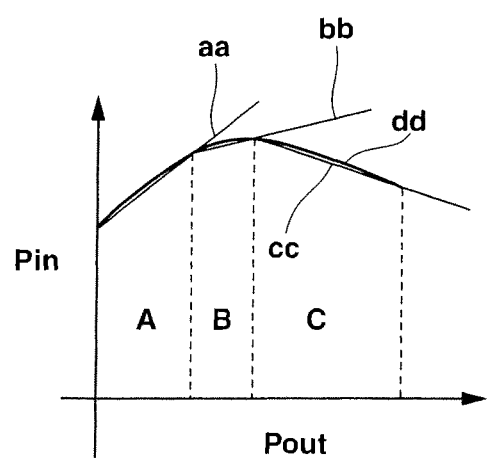
FIG. 3 is a view of an input-output voltage characteristic of the inverter.

FIG. 3 shows an input-output power characteristic of the inverter. The vertical axis represents the input voltage Pin and the horizontal axis represents the output voltage Pout. Correction calculating section 14 can estimate the input power inputted to the inverter under an arbitrary operation condition of the inverter, by interpolation as shown by "aa", "bb" and "cc", by calculation of software.

| $Pin = a1 \times Pout + b1$ (region $A$) | "aa" |
| $Pin = a2 \times Pout + b2$ (region $B$) | "bb" |
| $Pin = a3 \times Pout + b3$ (region $C$) | "cc" |

In these equations, a1~a3 and b1~b3 are constants.

In the inverter input-output characteristic shown by a line "dd", the region B is most efficient, and the efficiency becomes lower toward the region C (in the direction in which the power increases). In the region A in which the input power is smaller, too, the inverter efficiency decreases because of a loss. Correction calculating section 14 performs an interpolation linearly (with a linear expression) in each of the regions.

In the apparatus according to the present invention, the instantaneous output power calculating section 10 calculates the instantaneous output voltage Pout, and supplies the calculated instantaneous output voltage Pou to chopper control circuit 20, and the chopper control circuit 20 controls the chopper 6 by varying the limiter value of the limiter section 23 (23a, 23b) in the chopper control circuit 20. Thus, the power assist apparatus can assist the power by increasing/decreasing the power of the charging and discharging operations in dependence on the load condition.

Therefore, the apparatus according to the present invention makes it possible to perform the power assist control based on the estimated instantaneous output power, without the need for providing a power detecting device on the AC power supply's side of the inverter, and thereby to reduce the size of the apparatus. Furthermore, in the case of parallel operation, it is possible to adjust the load sharing easily. Moreover, it is possible to make maximal use of the charging and discharging efficiency by grasping the efficiency characteristic as the power assist apparatus and using its optimum efficiency point as a threshold of the limiter.

EXPLANATION OF REFERENCE NUMERALS

1 . . . inverter
2 . . . forward converting section
3 . . . bidirectional converting section
6 . . . chopper
7 . . . electricity storage device 8 . . . reactor
10 . . . instantaneous output power calculating section
11, 12 . . . coordinate transforming section
13 . . . power calculating section
20 . . . chopper control circuit
22 . . . voltage control section
23 . . . limiter section
24 . . . PWM control section

The invention claimed is:

1. A power assist apparatus for assisting a load power with an inverter connected with an AC power source and a power storage device which is connected with a DC circuit of the inverter and which includes a chopper and an electricity storage device, the power assist apparatus comprising: an instantaneous output power calculating section including a power calculating section configured to detect a voltage and a current between the inverter and a load, to transform the voltage and current by a coordinate transformation into a q-axis voltage and a q-axis current, and to calculate a power on the basis of the transformed voltage and current, and a correction calculating section to receive the calculated power, and to correct an input-output power characteristic of the inverter; and a chopper control circuit including voltage control sections configured to calculate a value of a charge command and a value of a discharge command, respectively, by receiving a deviation signal between a preset value of an upper limit voltage and the detected DC circuit voltage of the inverter and a deviation signal between a preset value of a lower limit voltage and the detected DC circuit voltage of the inverter, limiter sections to receive the signals, respectively, from the voltage control sections, and PWM control sections to produce PWM signals, respectively, by receiving signals from the limiter sections, the instantaneous output power calculating section and the limiter sections of the chopper control circuit being so arranged that a signal of the power calculated by the instantaneous output power calculating section is supplied to each of the limiter sections, and thereby each of the limiter sections varies a limiter value.

\* \* \* \* \*